United States Patent
Wu et al.

(10) Patent No.: US 10,367,926 B2
(45) Date of Patent: Jul. 30, 2019

(54) HOUSING ASSEMBLY FOR TERMINAL, TERMINAL AND MOBILE PHONE

(71) Applicant: GUANGDONG OPPO MOBILE TELECOMMUNICATIONS CORP., LTD., Dongguan (CN)

(72) Inventors: Qing Wu, Dongguan (CN); Yizhou Luo, Dongguan (CN); Liang Gu, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 42 days.

(21) Appl. No.: 15/698,123

(22) Filed: Sep. 7, 2017

(65) Prior Publication Data
US 2018/0183910 A1    Jun. 28, 2018

(30) Foreign Application Priority Data

Dec. 23, 2016   (CN) .......................... 2016 1 1206794
Dec. 23, 2016   (CN) ..................... 2016 2 1434716 U (51) Int. Cl.
*H01Q 7/08* (2006.01)
*H01Q 13/10* (2006.01)
(Continued)

(52) U.S. Cl.
CPC ............ *H04M 1/026* (2013.01); *H01Q 1/243* (2013.01); *H01Q 5/50* (2015.01); *H01Q 7/08* (2013.01);
(Continued)

(58) Field of Classification Search
CPC ........ H01Q 1/243; H01Q 7/08; H04B 5/0081; H04M 1/026
See application file for complete search history.

(56) References Cited

U.S. PATENT DOCUMENTS

2010/0330780 A1* 12/2010 Hwang ...................... C09J 7/38
                                                                     438/464
2011/0063184 A1*  3/2011 Furumura ........ G06K 19/07749
                                                                     343/856
(Continued)

FOREIGN PATENT DOCUMENTS

CN      203967240 U     11/2014
CN      104681990 A     6/2015
(Continued)

OTHER PUBLICATIONS

PCT/CN2017/100239 English translation of the International Search Report and Written Opinion dated Nov. 28, 2017, 12 pages.
(Continued)

*Primary Examiner* — David Bilodeau
(74) *Attorney, Agent, or Firm* — Lathrop Gage LLP (57) ABSTRACT

A housing assembly for a terminal and a terminal are provided. The housing assembly includes a housing, an antenna radiator and a ferrite. The antenna radiator is positioned at an outer face of the housing, and has a first orthographic projection region on the outer face. The ferrite is arranged on an inner face of the housing, and has a second orthographic projection region on the outer face. The first orthographic projection region is located in the second orthographic projection region.

20 Claims, 3 Drawing Sheets

(51) Int. Cl.
  *H04M 1/02* (2006.01)
  *H01Q 5/50* (2015.01)
  *H01Q 1/24* (2006.01)
  *H04B 5/00* (2006.01)

(52) U.S. Cl.
  CPC ........... *H01Q 13/10* (2013.01); *H04B 5/0081* (2013.01); *H04M 1/0266* (2013.01)

(56) References Cited

U.S. PATENT DOCUMENTS

| | | | | |
|---|---|---|---|---|
| 2012/0091821 | A1* | 4/2012 | Kato | H01Q 1/38 307/104 |
| 2014/0111388 | A1* | 4/2014 | Di Nallo | H01Q 1/2266 343/702 |
| 2014/0247188 | A1* | 9/2014 | Nakano | H01Q 1/243 343/702 |
| 2015/0070224 | A1* | 3/2015 | Nakano | H01Q 1/2225 343/702 |
| 2015/0326056 | A1* | 11/2015 | Koyanagi | H02J 7/025 320/108 |
| 2015/0357716 | A1* | 12/2015 | Chen | H04B 5/0081 343/702 |
| 2016/0056527 | A1* | 2/2016 | Pascolini | G06K 9/00006 343/702 |
| 2016/0164178 | A1* | 6/2016 | Komachi | H01Q 1/38 343/702 |
| 2017/0104259 | A1* | 4/2017 | Yosui | H01Q 1/2208 |

FOREIGN PATENT DOCUMENTS

| | | |
|---|---|---|
| CN | 105609929 A | 5/2016 |
| CN | 205376742 U | 7/2016 |
| CN | 105826656 A | 8/2016 |
| CN | 106657470 A | 5/2017 |
| KR | 20130005720 A | 1/2013 |

OTHER PUBLICATIONS

European Patent Application No. 17189205.2 extended Search and Opinion dated Mar. 7, 2018, 15 pages.

* cited by examiner

HOUSING ASSEMBLY FOR TERMINAL, TERMINAL AND MOBILE PHONE

CROSS-REFERENCE TO RELATED APPLICATION

This application claims priority to and benefits of Chinese Patent Application No. 201621434716.3, filed with State Intellectual Property Office on Dec. 23, 2016, and Chinese Patent Application 201611206794.2, filed with State Intellectual Property Office on Dec. 23, 2016, the entire content of which is incorporated herein by reference.

FIELD

The present disclosure relates to a technical field of communication equipment, and particularly, to a housing assembly for a terminal, a terminal and a mobile phone.

BACKGROUND

In the related art, a terminal (for example, a mobile phone) has a near field communication (NFC) function realized by a ferrite and a flexible printed circuit (FPC) coil. As for the design of the FPC coil, it is required to design FPC routing in form of multiple loops with a large area and provide a window in a metal battery cover. In addition, the NFC function can be realized by multiplexing an NFC antenna and a mobile communication antenna.

SUMMARY

According to a first aspect of the present disclosure, a housing assembly for a terminal is provided. The housing assembly according to embodiments of the present disclosure includes: a housing; an antenna radiator, positioned at an outer face of the housing, and having a first orthographic projection region on the outer face; and a ferrite, arranged on an inner face of the housing and having a second orthographic projection region on the outer face, and the first orthographic projection region being located in the second orthographic projection region.

According to a second aspect of the present disclosure, a terminal is provided. The terminal includes: a display unit, including a display panel; a housing, defining an embedding gap; an antenna radiator, embedded in the embedding gap and having a first orthographic projection region on the outer face; and a ferrite, arranged on an inner face of the housing and having a second orthographic projection region on the outer face, and the first orthographic projection region being located in the second orthographic projection region.

According to a third aspect of the present disclosure, a mobile phone is provided. The mobile phone includes a front case provided with a display unit; a rear case, assembled with the front case; a plurality of radiator coils, positioned at an outer face of the rear case and having a first orthographic projection region on the outer face; and a ferrite, arranged on an inner face of the rear case and having a second orthographic projection region on the outer face, and the first orthographic projection region being located in the second orthographic projection region.

DETAILED DESCRIPTION

Embodiments of the present disclosure will be described in detail and examples of the embodiments will be illustrated in the accompanying drawings. The embodiments described herein with reference to the drawings are explanatory, which aim to illustrate the present disclosure, but shall not be construed to limit the present disclosure.

In the description of the present disclosure, it is to be understood that terms such as "central," "length," "width," "thickness," "upper," "lower," "front," "rear," "left," "right," "vertical," "horizontal," "top," "bottom," "inner," "outer," "axial" and "circumferential" should be construed to refer to the orientation or the position as described or as illustrated in the drawings under discussion. These relative terms are only used to simplify description of the present disclosure, and do not indicate or imply that the device or element referred to must have a particular orientation, or constructed or operated in a particular orientation. Thus, these terms cannot be constructed to limit the present disclosure.

In addition, terms such as "first" and "second" are used herein for purposes of description and are not intended to indicate or imply relative importance or significance or to imply the number of indicated technical features. Thus, the feature defined with "first" and "second" can comprise one or more of this feature. In the description of the present disclosure, the term "a plurality of" means two or more than two, unless specified otherwise.

In the description of embodiments of the present disclosure, unless specified or limited otherwise, the terms "mounted," "connected," "coupled," "fixed" and the like are interpreted broadly, and can be, for example, fixed connections, detachable connections, or integral connections; can also be mechanical or electrical connections or communicated with each other; can also be direct connections or indirect connections via intervening structures; can also be inner communications or mutual interaction of two elements, which can be understood by those skilled in the art according to specific situations.

A housing assembly 100 for a terminal 500 and the terminal 500 according to embodiments of the present disclosure will be described with reference to FIGS. 1 to 3. It should be noted that "the terminal" used herein includes, but is not limited to, a satellite or cellular telephone (e.g. a mobile phone); a personal communication system (PCS) terminal capable of combining cellular radiotelephone with data processing, facsimile and data communication capabilities; a personal digital assistant (PDA) integrated with a radiotelephone, a pager, an Internet/Intranet access, a Web browser, a notebook, a calendar, and/or a global positioning system (GPS) receiver; and conventional laptop and/or palmtop receivers or other electronic devices including radiotelephone transceivers.

Figure 1:
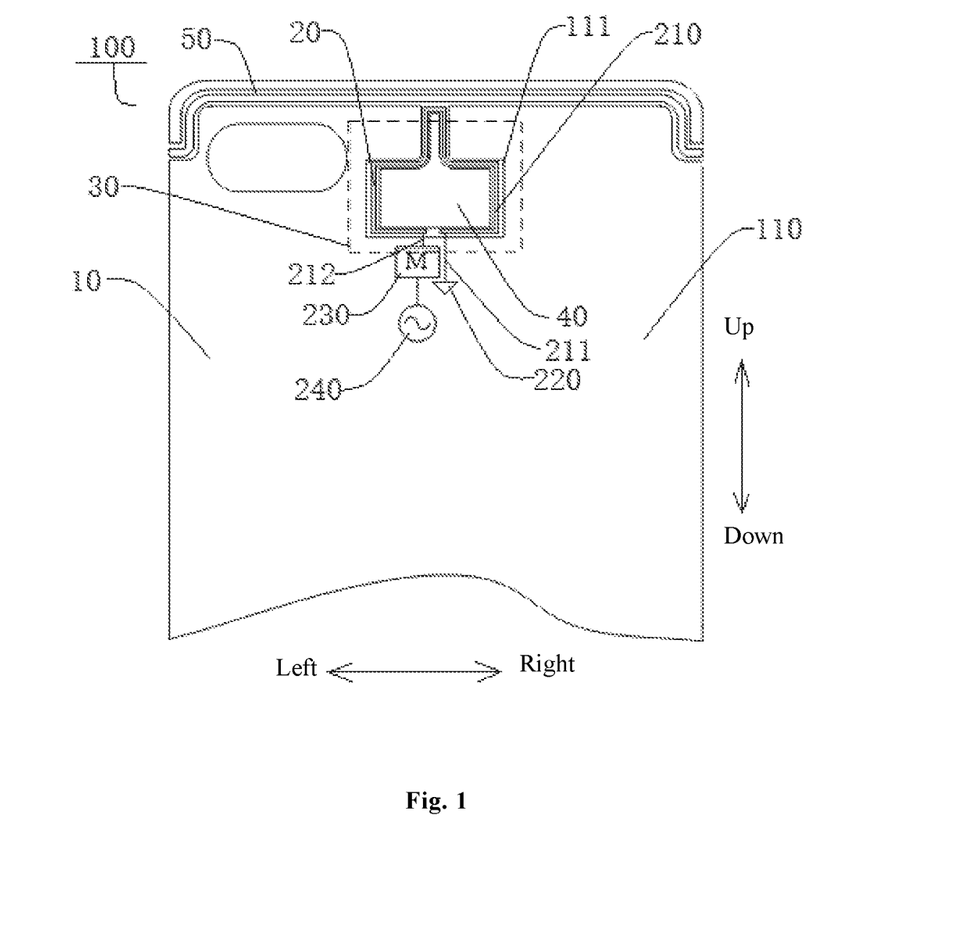
FIG. 1 illustrates a schematic view of a housing assembly for a terminal according to an embodiment of the present disclosure.

FIG. 1 illustrates the housing assembly 100 for the terminal 500 according to embodiments of the present disclosure, the housing assembly 100 includes a housing 10, an antenna radiator 20 and a ferrite 30.

Figure 2:
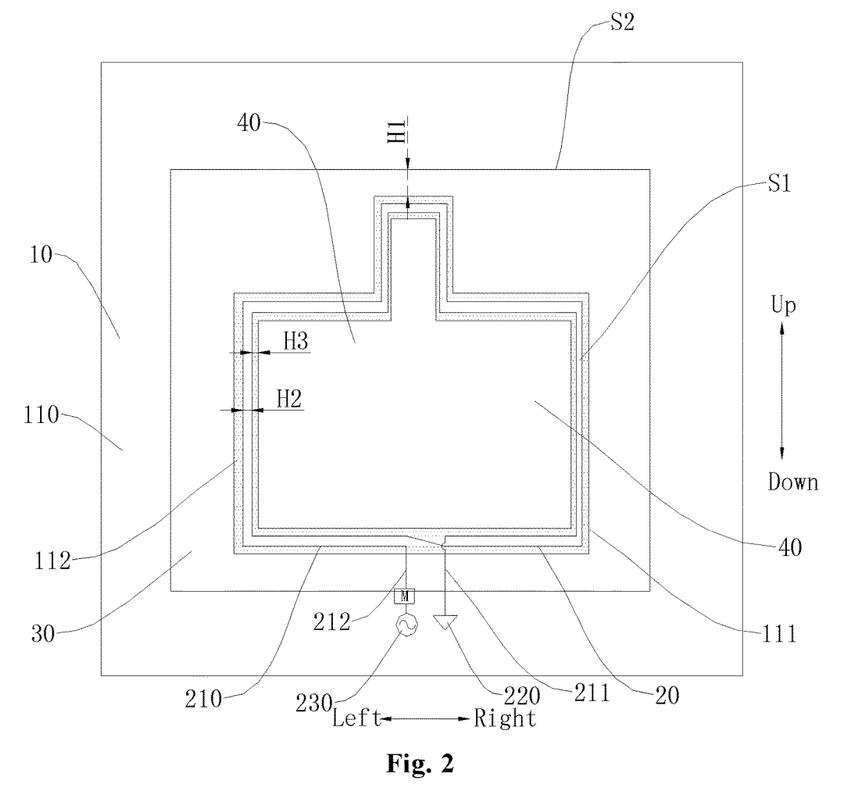
FIG. 2 illustrates a partial schematic view of a housing assembly for a terminal according to an embodiment of the present disclosure.
Figure 3:
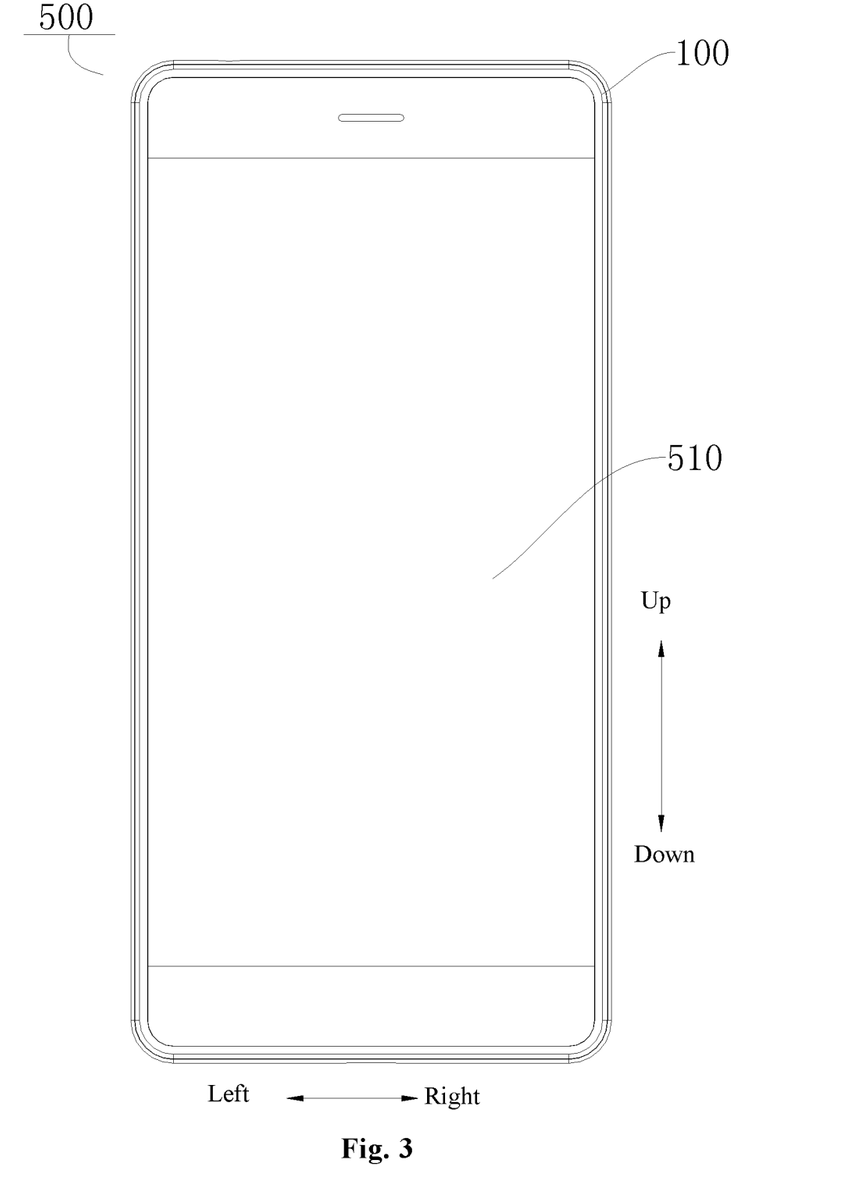
FIG. 3 illustrates a schematic view of a terminal according to an embodiment of the present disclosure.

Specifically, as illustrated in FIG. 2, the antenna radiator 20 is positioned at an outer face 110 of the housing 10 and has a first orthographic projection region on the outer face 110, and the first orthographic projection region is denoted by a region S1. The ferrite 30 is arranged on an inner face of the housing 10 and has a second orthographic projection region on the outer face, and the second orthographic projection region is denoted by a region S2. The region S1 is located in the region S2.

It could be understood that the outer face 110 and the inner face of the housing 10 are concerned with relative position between the housing 10 and the terminal 500. For instance, in the case of the mobile phone, the housing 10 can include a front case and a rear case, and the front case is assembled with the rear case to define a closed space. The front case generally refers to a side displayed by a display unit 510 of the mobile phone (as illustrated in FIG. 3). The rear case is opposite the front case and located in the rear of the mobile phone. The antenna radiator 20 and the ferrite 30 can be assembled to the rear case of the mobile phone. For instance, FIG. 1 illustrates an example, the housing 10 can be the rear case of the terminal 500, such that the inner face of the housing 10 refers to a face of the housing 10 facing an internal structure of the terminal 500, while the outer face 110 of the housing 10 refers to a face of the housing 10 facing away the internal structure of the terminal 500.

It should be noted that in order to prevent internal structures (such as a battery, a mainboard, etc.) of the terminal 500 from causing signal interference to the antenna radiator 20 and avoid influencing a normal connection transmission function of the antenna radiator 20, the ferrite 30 can be provided between the antenna radiator 20 and the internal structures of the terminal 500. The ferrite 30 can hinder the internal structures of the terminal 500 from causing the signal interference to the antenna radiator 20, such that the antenna radiator 20 has a good connection transmission function in a certain range.

In the related art, ferrite and an antenna radiator are integrally arranged in a housing for a terminal. For example, the ferrite is adhered to an outer face of a battery of the terminal, and the antenna radiator is opposite the ferrite and attached to a rear cover of the battery. In this way, it is necessary to reserve an assembly space for the ferrite and antenna radiator in the terminal, thereby increasing a thickness of a terminal product. Moreover, the antenna radiator generates an eddy current on the rear case of the terminal, thus affecting signal transmission of the antenna radiator.

For the housing assembly 100 for the terminal 500 according to embodiments of the present disclosure, the antenna radiator 20 is positioned at the outer face 110 of the housing 10, that is, by utilizing the thickness of the housing 10, the antenna radiator 20 is embedded in the housing 10 from the outer face 110 of the housing 10. The ferrite 30 is arranged in the housing 10 and located opposite the antenna radiator 20. Thus, the housing assembly 100 for the terminal 500 can have a compact structure, thereby making the whole terminal 500 lightweight and thin. In addition, the projection region S1 on the outer face 110 of the housing 10 formed by the antenna radiator 20 is smaller than the projection region S2 on the outer face 110 of the housing 10 formed by the ferrite 30 (as illustrated in FIG. 2). Thus, the ferrite 30 is enabled to "shield" the antenna radiator 20, preventing the internal structures of the terminal 500 from causing the signal interference and affecting the signal transmission of the antenna radiator 20. Moreover, the antenna radiator 20 is positioned at the outer face 110 of the housing 10 to make the antenna radiator 20 closer to a matching device, so that the signal transmission between the terminal 500 and the matching device is more convenient and accurate.

For the housing assembly 100 for the terminal 500 according to embodiments of the present disclosure, by embedding the antenna radiator 20 in the outer face 110 of the housing 10, and arranging the ferrite 30 on the inner face of the housing 10 and opposite to the antenna radiator 20, it is possible to make the structure of the housing assembly 100 for the terminal 500 more compact, thereby achieving a lightweight and thin design of a product. Additionally, the projection region on the outer face 110 of the housing 10 formed by the antenna radiator 20 is smaller than the projection region on the outer face 110 of the housing 10 formed by the ferrite 30, which can prevent the internal structures of the terminal 500 from causing the signal interference to the antenna radiator 20. Moreover, the antenna radiator 20 outside the housing 10 can be closer to the matching device, thereby facilitating the signal transmission of the terminal 500 and promoting overall performance of the product.

FIG. 1 illustrates an embodiment of the present disclosure, the housing 10 defines an embedding gap 111, and the antenna radiator 20 is arranged in the embedding gap 111 and spaced apart from the housing 10 by means of an insulation bonding layer 112. That is, the outer face 110 of the housing 10 can define the embedding gap 111 to embed the antenna radiator 20 in the housing 10. Thus, it is possible to reduce an overall thickness of the housing assembly 100 and facilitate a light and thin design of the whole terminal 500. It could be understood that with the trend of the light and thin design of the terminal 500, the housing assembly 100 for the terminal 500 can be configured as a metal assembly, so as to ensure structural strength of the whole terminal 500 and prevent deformation and breakage of the terminal. However, the metal housing 10 tends to cause the signal interference to the antenna radiator 20, affecting the signal transmission of the antenna radiator 20. The antenna radiator 20 is embedded in the embedding gap 111 of the housing 10 and spaced apart from the housing 10 by means of the insulation bonding layer 112, and the insulation bonding layer 112 can be glue, which is advantageous to prevent the metal housing 10 from causing the signal interference to the antenna radiator 20 and make the antenna radiator 20 have a better signal transmission capability.

Further, FIG. 2 illustrates that a thickness H3 of the insulation bonding layer 112 can be greater than or equal to 0.1 mm. It is verified through test that the metal housing 10 can be effectively prevented from causing the signal interference to the antenna radiator 20 when the thickness H3 of the insulation bonding layer 112 is greater than or equal to 0.1 mm.

In an embodiment of the present disclosure, the antenna radiator 20 is a radiation coil 210 formed by one wire winding around a common axis, one end of the wire is grounded, and the other end of the wire is electrically coupled with a matching circuit 230. In other words, the antenna radiator 20 can be formed as an annular radiation coil 210 by winding one wire around a region. As a result, an arrangement space of the antenna radiator 20 can be reduced, and the surrounding radiation coil 210 can generate a signal magnetic field after being energized. As illustrated in FIGS. 1 and 2, a matching-circuit connecting terminal 212 at a left end of the wire (referring to a left-right direction as illustrated in FIGS. 1 and 2) is connected with the matching circuit 230. For example, the matching circuit 230 can be in communication connection with a built-in chip (e.g. a signal source 240) provided in the terminal 500 and matched according to related protocol. The matching-circuit connecting terminal 212 of the radiation coil 210 is connected with the matching circuit 230. A ground connecting terminal 211 at a right end of the wire (referring to the left-right direction as illustrated in FIGS. 1 and 2) is connected with a ground point 220. It could be understood that when the annular radiation coil 210 is energized, a magnetic field can be generated. Thus, it is possible to enable the antenna radiator 20 to implement the signal transmission through electromagnetic induction coupling of a radio frequency portion in a spectrum.

In an embodiment of the present disclosure, a plurality of radiation coils 210 can be provided, and the plurality of radiation coils 210 can further enhance a signal from the antenna radiator 20. In order to prevent signal interference among the radiation coils 210, the plurality of radiation coils 210 are disposed around the axis and spaced apart from each other.

Further, a distance H2 between two adjacent radiation coils 210 can be larger than or equal to 0.1 mm. It is verified through test that when the distance H2 between two adjacent radiation coils 210 is greater than or equal to 0.1 mm, the signal interference among the plurality of radiation coils 210 can be eliminated effectively, and the plurality of radiation coils 210 have a good cooperative transmission capability among them, thereby further enhancing the signal transmission capability of the antenna radiator 20.

In some embodiments of the present disclosure, the antenna radiator 20 can be a near field communication (NFC) radiator. NFC is a new technology, and devices (such as a mobile phone) that use the NFC technology can perform data exchange in close proximity to each other. The NFC technology is evolved from and integrated by non-contact radio frequency identification (RFID) and interconnection technology, and since functions of an inductive card reader, an inductive card and point-to-point communication are integrated in a single chip, the mobile terminal 500 can be utilized to achieve mobile payment, electronic ticketing, access control, mobile identification, anti-counterfeiting and other applications. By providing the NFC in the terminal 500, the performance of the terminal product can be further enhanced, thereby improving market competitiveness of the product.

FIG. 2 illustrates an embodiment of the present disclosure, a minimum distance H1 between a contour line of the region S1 and a contour line of the region S2 is greater than or equal to 1 mm. It could be understood that in order to prevent the internal structures of the terminal 500 from causing the signal interference to the antenna radiator 20 and avoid affecting implementation of corresponding functions of the terminal 500, the ferrite 30 can be arranged between the antenna radiator 20 and internal components of the terminal 500 to effectively prevent the internal components (e.g. the battery, the mainboard, etc.) of the terminal 500 from causing the signal interference to the antenna radiator 20. It is verified through tests that when the minimum distance H1 between the projection region S1 on the outer face 110 formed by the antenna radiator 20 and the projection region S2 on the outer face 110 formed by the ferrite 30 is greater than or equal to 1 mm, the ferrite 30 can effectively prevent the internal components of the terminal 500 from interfering with the signal transmission of the antenna radiator 20, such that the antenna radiator 20 has a better signal transmission capability.

In some embodiments of the present disclosure, the contour line of the region S1 can be circular, elliptical or polygonal. In other words, the radiation coil 210 of the antenna radiator 20 is not limited to winding in a specific shape. For instance, in examples of FIGS. 1 and 2, the contour line of the region S1 of the antenna radiator 20 on the outer face 110 can be in a shape of a frame of a polygon having a first rectangular portion and a second rectangular portion, the first rectangular portion is above the second rectangular portion and perpendicular to the second rectangular portion, such as "凸". In some other embodiments of the present disclosure, the region S1 can be circular, elliptical or polygonal.

FIG. 1 illustrates an embodiment of the present disclosure, a filling layer 40 is provided in the region S1. That is, the filling layer 40 can be provided in an inner region defined by the radiation coil 210 of the antenna radiator 20, and the filling layer 40 can be a floating metal, plastic, camera, fingerprint identification module, logo and flashlight, etc. The structural space of the housing assembly 100 can be fully utilized, and the whole product of the terminal 500 can become more compact and beautiful.

In some embodiments of the present disclosure, the housing 10 can define a slot 50, and the slot 50 penetrates through two opposite lateral walls of the housing 10 and is spaced apart from the antenna radiator 20. A metal strip is provided in the slot 50, and the metal strip is spaced apart from the housing 10. For instance, in the example of FIG. 1, the antenna radiator 20 is arranged at a slightly upper position on the housing 1. An upper end of the housing 10 defines the slot 50 extending along the left-right direction (e.g. the left-right direction in FIG. 1), and left and right ends of the slot 50 penetrate left and right lateral walls of the housing 10.

A middle portion of the embedding gap 111 protrudes upwards to be in communication with the slot 50. Thus, it is possible to weaken the signal interference caused by the eddy current generated on the metal housing 10 after the antenna radiator 20 is energized. The metal strip is provided in the slot 50, and an insulating layer can be provided between the slot 50 and the metal strip. By providing the metal strip, the antenna radiator 20 can radiate through the metal strip to reduce the use of the radiation coil 210, thereby saving the cost. The metal strip is spaced apart from the housing 10 to prevent the housing 10 from causing the signal interference to the antenna radiator 20.

Further, the slot 50 can be C-shaped. As illustrated in FIG. 1, the slot 50 in the upper end of the housing 10 can be configured as a C shape with a downward opening, so as to improve the overall aesthetics of the terminal 500, and break away from a three-section design of the terminal 500 (such as the mobile phone) in the related art, thereby enhancing the market competitiveness of the terminal 500. In some other embodiments of the present disclosure, the slot 50 can be linear, or no slot is defined, or the slot 50 can be defined at a lower end of the housing 10 or other locations.

The housing assembly 100 for the terminal 500 according to embodiments of the present disclosure will be described in a specific embodiment with reference to FIGS. 1 to 3. It could be understood that the following description is only illustrative and is not intended to limit the present disclosure.

FIG. 1 illustrates the housing assembly 100 for the terminal 500, the housing assembly 100 includes a housing 10, an antenna radiator 20 and a ferrite 30.

As illustrated in FIG. 1, an upper position (referring to an up-down direction illustrated in FIG. 1) on an outer face 110 of the housing 10 defines an embedding gap 111 in a shape of a frame of a polygon having a first rectangular portion and a second rectangular portion, the first rectangular portion is above the second rectangular portion and perpendicular to the second rectangular portion, such as "凸". A C-shaped slot 50 with a downward opening is defined above the embedding gap 111, and left and right ends (e.g. the left-right direction illustrated in FIG. 1) of the slot 50 penetrate left and right lateral walls of the housing 10. A metal strip is provided in the slot 50 and spaced apart from the housing 10.

The antenna radiator 20 is an NFC radiator, and the antenna radiator 20 is embedded in the embedding gap 111. An insulation bonding layer 112 is provided between the antenna radiator 20 and the housing 10, and has a thickness H3 greater than or equal to 1 mm. As illustrated in FIG. 1, the antenna radiator 20 is formed by winding a plurality of radiator coils 210, and a minimum distance H2 between two adjacent radiation coils 210 can be larger than or equal to 1 mm. Each radiator coil 210 is formed by one wire along the embedding gap 111 and is in the shape of the a frame of a polygon having a first rectangular portion and a second rectangular portion, the first rectangular portion is above the second rectangular portion and perpendicular to the second rectangular portion, such as "凹". A matching-circuit connecting terminal 212 at a left end of the wire (referring to the left-right direction as illustrated in FIG. 1) is coupled with one end of a matching circuit 230 in the terminal 500, and the other end of the matching circuit 230 is coupled with a signal source 240. A ground connecting terminal 211 at a right end of the wire (referring to the left-right direction as illustrated in FIG. 1) is connected with a ground point 220. The ferrite 30 is arranged on an inner face of the housing 10 and opposite to the antenna radiator 20.

As illustrated in FIG. 2, the antenna radiator 20 has a first orthographic projection region on the outer face 110 which is denoted by a region S1, and a contour line of the region S1 is in the shape of a frame of a polygon having a first rectangular portion and a second rectangular portion, the first rectangular portion is above the second rectangular portion and perpendicular to the second rectangular portion, such as "凹". The ferrite 30 has a second orthographic projection region on the outer face which is denoted by a region S2, and a contour line of the region S2 is rectangular. The region S1 is located in the region S2, and a minimum distance H1 between the region S1 and the region S2 is greater than or equal to 1 mm. A filling layer 40 is provided in the region S1 in the shape of "凹", and the filling layer 40 is a logo of the terminal 500.

Therefore, by embedding the antenna radiator 20 in the outer face 110 of the housing 10, and arranging the ferrite 30 on the inner face of the housing 10 and opposite to the antenna radiator 20, it is possible to make a structure of the housing assembly 100 for the terminal 500 more compact and hence lighten the product. Additionally, the projection region of on the outer face 110 of the housing 10 formed by the antenna radiator 20 is in the projection region on the outer face 110 formed by the ferrite 30, such that the internal components of the terminal 500 can be prevented from causing the signal interference to the antenna radiator 20, and the radiator is guided to radiate an NFC signal more effectively. Moreover, the antenna radiator 20 outside the housing 10 can be closer to a matching device, thereby facilitating the signal transmission of the terminal 500 and promoting the overall performance of the product.

The terminal 500 according to embodiments of the present disclosure includes the above housing assembly 100. It should be noted that the terminal 500 can be various devices capable of acquiring data from the outside and processing the data, or the terminal 500 can be a variety of devices with a built-in battery and capable of receiving current from the outside to charge the battery, such as a mobile phone, a tablet computer, a computing device, or an information display device. The mobile phone is only an example of the terminal device, and is not intended to limit the present disclosure. The present disclosure can be applied to an electronic device such as a mobile phone or a tablet computer, and the present disclosure is not limited thereto.

In embodiments of the present disclosure, the mobile phone can include a radio frequency (RF) circuit, a memory, an input unit, a wireless fidelity (Wi-Fi) module, the display unit 510, a sensor, an audio circuit, a processor, a projection unit, a shooting unit, a battery and other components. The components of the mobile phone can be electrically connected with a circuit board assembly.

The RF circuit can be used to receive and transmit a signal during information transmission and reception or during a call. Especially, when downlink information from a base station is received, the RF circuit sends the downlink information to the processor for being processed, and additionally sends uplink data from the mobile phone to the base station. Usually, the RF circuit includes but is not limited to an antenna, at least one amplifier, a transceiver, a coupler, a low noise amplifier, a duplexer and etc. In addition, the RF circuit can communicate with the network and other devices via wireless communication.

The memory can be used to store software programs and modules, and the processor runs various software applications and performs data processing by running the software programs and modules stored in the memory. The memory can mainly include a program storage area and a data storage area. The program storage area can store an operating system, at least one application program required for a function (such as a voice playback function, an image playback function and etc.); the data storage area can store data (such as audio data, contacts and etc.) created according to the use of the mobile phone. In addition, the memory can include a high-speed random access memory, and can also include a non-volatile memory, such as at least one disk storage device and flash memory device, or include other volatile solid state memory devices.

The input unit can be configured to receive incoming numbers or character information, and generate a key signal related to user settings and function control of the mobile phone. Specifically, the input unit can include a touch panel and other input devices. The touch panel, also known as a touch screen, can collect a touch operation made by a user on or near the touch panel (for example, an operation made by the user on the touch panel or near the touch panel by means of a finger, a touch pen or any other suitable object or accessory), and drive the corresponding connection device according to a preset program.

Optionally, the touch panel can include a touch detection device and a touch controller. The touch detection device is configured to detect a touch orientation of the user, detect a signal from the touch operation, and transmit the signal to the touch controller. The touch controller is configured to receive the touch signal from the touch detection device, convert it into contact coordinates and send the contact coordinates to the processor and can be configured to receive and execute a command from the processor. In addition, it is possible to touch the panel in resistive type, capacitive type, infrared type, face acoustic wave and other types to realize the touch panel. The input unit can include other input devices apart from the touch panel. Specifically, other input devices can include, but are not limited to one or more of a physical keypad, a function key (e.g. a volume control button, a power button, etc.), a trackball, a mouse and an operating rod.

The display unit 510 is configured to display information input by or presented to the user, and various menus of the mobile phone. The display unit 510 can include a display panel, and optionally, the display panel can be configured in forms of a liquid crystal display (LCD), an organic light-emitting diode (OLED) and the like. Further, the touch panel can overlay the display panel; when the touch panel detects a touch operation on or near it, the touch operation is sent to the processor to determine which type the touch event belongs to, and then the processor provides corresponding visual output on the display panel according to the type of the touch event.

The audio circuit, a loudspeaker and a microphone can provide an audio interface between the user and the mobile phone. The audio circuit can transmit an electrical signal converted from the received audio data to the loudspeaker, and the loudspeaker converts the electrical signal into an audio signal to be output. On the other hand, the microphone converts the audio signal collected into the electrical signal, the audio circuit receives and converts the electrical signal into audio data, and transmits the audio data to the processor. After processed by the processor, the audio data is sent to another mobile phone via the RF circuit, or output to the memory for further processing.

Wi-Fi is a short distance wireless transmission technology, and the mobile phone can help the user send and receive e-mails, browse websites and access streaming media through a Wi-Fi module which provides the user with wireless broadband access to the Internet. It could be understood that the Wi-Fi module is not an indispensable constituent of the mobile phone and can be omitted as needed without departing from the scope of the present disclosure.

The processor is a control center of the mobile phone and mounted to the circuit board assembly. The processor is connect to various parts of the mobile phone by means a variety of interfaces and lines to, and performs various functions of the mobile phone and data processing by running or executing software programs and/or modules stored in the memory and by invoking the data stored in the memory, so as to monitor the mobile phone overall. In at least one embodiment, the processor can include one or more processing units; preferably, the processor can be integrated with an application processor and a modem processor, in which the application processor mainly handles the operating system, the user interface and the application program, while the modem processor mainly deals with wireless communication.

In addition, the mobile phone further includes a power source (e.g. a battery) that supplies power to components. The power source can be logically connected to the processor through a power management system, so as to achieve the management of charging, discharging, and power consumption and other functions through the power management system. Although not illustrated, the mobile phone can include a Bluetooth module and a sensor ((such as an attitude sensor, a light sensor), and can also be equipped with a barometer, a hygrometer, a thermometer, an infrared sensor and other sensors, which will not be elaborated herein.

It should be noted that realization of functions of various modules of the mobile phone and cooperation among the modules require a safe and stable operating environment. The modules and components of the mobile phone can be assembled inside the housing assembly 100 of the mobile phone. In order to achieve the lightweight and thin design, the various parts of the mobile phone need to be designed in a compact arrangement. For the housing assembly 100 according to embodiments of the present disclosure, the antenna radiator 20 is positioned at the outer face 110 of the housing to facilitate the lightweight and thin design of the mobile phone.

For the terminal 500 according to embodiments of the present disclosure, by embedding the antenna radiator 20 in the outer face 110 of the housing 10, and arranging the ferrite 30 on the inner face of the housing 10 and opposite to the antenna radiator 20, it is possible to make the structure of the housing assembly 100 for the terminal 500 more compact, thereby achieving the lightweight and thin design of the product. Additionally, the projection region on the outer face 110 of the housing 10 formed by the antenna radiator 20 is in the projection region on the outer face 110 of the housing 10 formed by the ferrite 30, which can prevent the internal components of the terminal 500 from causing the signal interference to the antenna radiator 20. Moreover, the antenna radiator 20 outside the housing 10 can be closer to the matching device, thereby facilitating the signal transmission of the terminal 500 and promoting the overall performance of the product.

Reference throughout this specification to "an embodiment," "some embodiments," "an example," "a specific example" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics can be combined in any suitable manner in one or more embodiments or examples. Those skilled in the art can combine or composite features in different embodiments or examples described in the specification without contradiction.

Although embodiments of the present disclosure have been illustrated and described, it would be appreciated by those skilled in the art that the embodiments are explanatory and cannot be construed to limit the present disclosure, and changes, modifications, alternatives and variations can be made in the embodiments without departing from the scope of the present disclosure.

What is claimed is:

1. A housing assembly for a terminal, comprising:
   a housing;
   an antenna radiator, positioned at an outer face of the housing, and having a first orthographic projection region on the outer face; and
   a ferrite, arranged on an inner face of the housing and having a second orthographic projection region on the outer face, and the first orthographic projection region being located in the second orthographic projection region,
   wherein the housing defines a slot, the slot penetrates through two opposite lateral walls of the housing and is spaced apart from the antenna radiator, the slot is provided with a metal strip therein, and the metal strip is spaced apart from the housing.

2. The housing assembly according to claim 1, wherein the housing defines an embedding gap, and the antenna radiator is embedded in the embedding gap and spaced apart from the housing through an insulation bonding layer.

3. The housing assembly according to claim 2, wherein a middle portion of the embedding gap extends upwards to be in communication with the slot.

4. The housing assembly according to claim 2, wherein the insulation bonding layer has a thickness greater than or equal to 0.1 mm.

5. The housing assembly according to claim 1, wherein the antenna radiator is a radiation coil formed by one wire winding around a common axis, and the wire has an end grounded and another end electrically coupled with a matching circuit.

6. The housing assembly according to claim 5, wherein a plurality of radiation coils are provided, and the plurality of radiation coils are disposed around the axis and spaced apart from each other.

7. The housing assembly according to claim 6, wherein two adjacent radiation coils are at a distance larger than or equal to 0.1 mm.

8. The housing assembly according to claim 5, wherein the first orthographic projection region is provided with a filling layer, the filling layer is provided in an inner region defined by the radiation coil.

9. The housing assembly according to claim 8, wherein at least one of a floating metal, a plastic, a camera, a fingerprint identification module, a logo and a flashlight is arranged in the filling layer.

10. The housing assembly according to claim 1, wherein the antenna radiator is configured as a near field communication (NFC) radiator.

11. The housing assembly according to claim 1, wherein a minimum distance between a contour line of the first orthographic projection region and a contour line of the second orthographic projection region is greater than or equal to 1 mm.

12. The housing assembly according to claim 1, wherein the contour line of the first orthographic projection region is circular, elliptical or polygonal.

13. The housing assembly according to claim 1, wherein the slot is C-shaped.

14. A terminal, comprising:
   a display unit, comprising a display panel;
   a housing, defining an embedding gap at an outer face of the housing;
   an antenna radiator, embedded in the embedding gap and having a first orthographic projection region on the outer face; and
   a ferrite, arranged on an inner face of the housing and having a second orthographic projection region on the outer face, and the first orthographic projection region being located in the second orthographic projection region,
   wherein the housing defines a slot, the slot penetrates through two opposite lateral walls of the housing and is spaced apart from the antenna radiator, the slot is provided with a metal strip therein, and the metal strip is spaced apart from the housing.

15. The terminal according to claim 14, wherein the embedding gap is in a shape of a frame of a polygon having a first rectangular portion and a second rectangular portion, the first rectangular portion is above the second rectangular portion and perpendicular to the second rectangular portion; the antenna radiator is constructed by winding a plurality of radiator coils, each radiator coil is formed by one wire along the embedding gap and is in the shape of a frame of a polygon having a first rectangular portion and a second rectangular portion, the first rectangular portion is above the second rectangular portion and perpendicular to the second rectangular portion.

16. The terminal according to claim 14, wherein the first orthographic projection region has a contour line in a shape of a frame of a polygon having a first rectangular portion and a second rectangular portion, the first rectangular portion is above the second rectangular portion and perpendicular to the second rectangular portion, and the second orthographic projection region has a rectangular contour line.

17. The terminal according to claim 14, wherein a middle portion of the embedding gap extends upwards to be in communication with the slot.

18. A mobile phone, comprising:
   a front case provided with a display unit;
   a rear case, assembled with the front case;
   a plurality of radiator coils, positioned at an outer face of the rear case and having a first orthographic projection region on the outer face; and
   a ferrite, arranged on an inner face of the rear case and having a second orthographic projection region on the outer face, and the first orthographic projection region being located in the second orthographic projection region,
   wherein the rear case defines a slot, the slot penetrates through two opposite lateral walls of the rear case and is spaced apart from the plurality of radiator coils, the slot is provided with a metal strip therein, and the metal strip is spaced apart from the rear case.

19. The mobile phone according to claim 18, wherein the rear case is made of metal.

20. The mobile phone according to claim 18, wherein the slot is in the shape of C with a downward opening.

* * * * *